United States Patent
Teeter et al.

(10) Patent No.: US 11,093,424 B1
(45) Date of Patent: Aug. 17, 2021

(54) RACK SWITCH COUPLING SYSTEM

(71) Applicant: Dell Products L.P., Round Rock, TX (US)

(72) Inventors: Victor Teeter, Round Rock, TX (US); Shree Rathinasamy, Round Rock, TX (US); Sumedh Wasudeo Sathaye, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/774,345

(22) Filed: Jan. 28, 2020

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
CPC .............................. G06F 13/36; G06F 2213/40
USPC ............ 710/2, 300, 303, 305; 370/362, 911; 361/781
See application file for complete search history.

(56) References Cited

U.S. PATENT DOCUMENTS

| | | | | |
|---|---|---|---|---|
| 5,999,527 A * | 12/1999 | Petersen | ............. | H04L 12/5601 370/360 |
| 7,930,440 B2 * | 4/2011 | Leigh | .................... | G06F 9/4411 710/8 |
| 9,531,645 B2 * | 12/2016 | Loiferman | ........... | H05K 7/1457 |
| 10,736,227 B1 * | 8/2020 | Rivaud | ................. | H05K 7/026 |
| 2010/0250810 A1 * | 9/2010 | Abdul | ..................... | H04L 69/40 710/260 |
| 2012/0020349 A1 * | 1/2012 | Dunwoody | ........... | G06F 15/161 370/351 |
| 2015/0116976 A1 * | 4/2015 | Ritter | ..................... | H04Q 1/116 361/826 |
| 2015/0289405 A1 * | 10/2015 | Stewart | .................. | H05K 7/183 211/26 |
| 2015/0293867 A1 * | 10/2015 | Steinmacher-Burow | | H05K 1/144 710/301 |
| 2016/0012006 A1 * | 1/2016 | Motamedi | ................ | H05K 7/10 710/301 |
| 2016/0073542 A1 * | 3/2016 | Huang | ................. | H05K 7/1441 361/781 |
| 2016/0335209 A1 * | 11/2016 | Jau | .......................... | G06F 13/36 |
| 2017/0285729 A1 * | 10/2017 | Yang | ......................... | G06F 1/20 |
| 2019/0007224 A1 * | 1/2019 | Flajslik | ............... | H04L 41/0803 |
| 2019/0124422 A1 * | 4/2019 | Diaz | ..................... | H04Q 1/023 |

\* cited by examiner

*Primary Examiner* — Idriss N Alrobaye
*Assistant Examiner* — Henry W Yu
(74) *Attorney, Agent, or Firm* — Haynes and Boone, LLP

(57) ABSTRACT

A rack switch coupling system includes a plurality of computing devices that are positioned in a rack in a stacked orientation. Each of the plurality of computing devices includes a top surface that corresponds with a first plane associated with that computing device, and a bottom surface that is located opposite that computing device from the top surface and that corresponds with a second plane associated with that computing device. The rack switch coupling system also includes a switch system that is positioned in the rack and that includes respective ports cabled to each of the plurality of computing devices, with each of the respective ports located adjacent the computing device to which it is cabled and between the first plane and the second plane associated with that computing device.

17 Claims, 15 Drawing Sheets

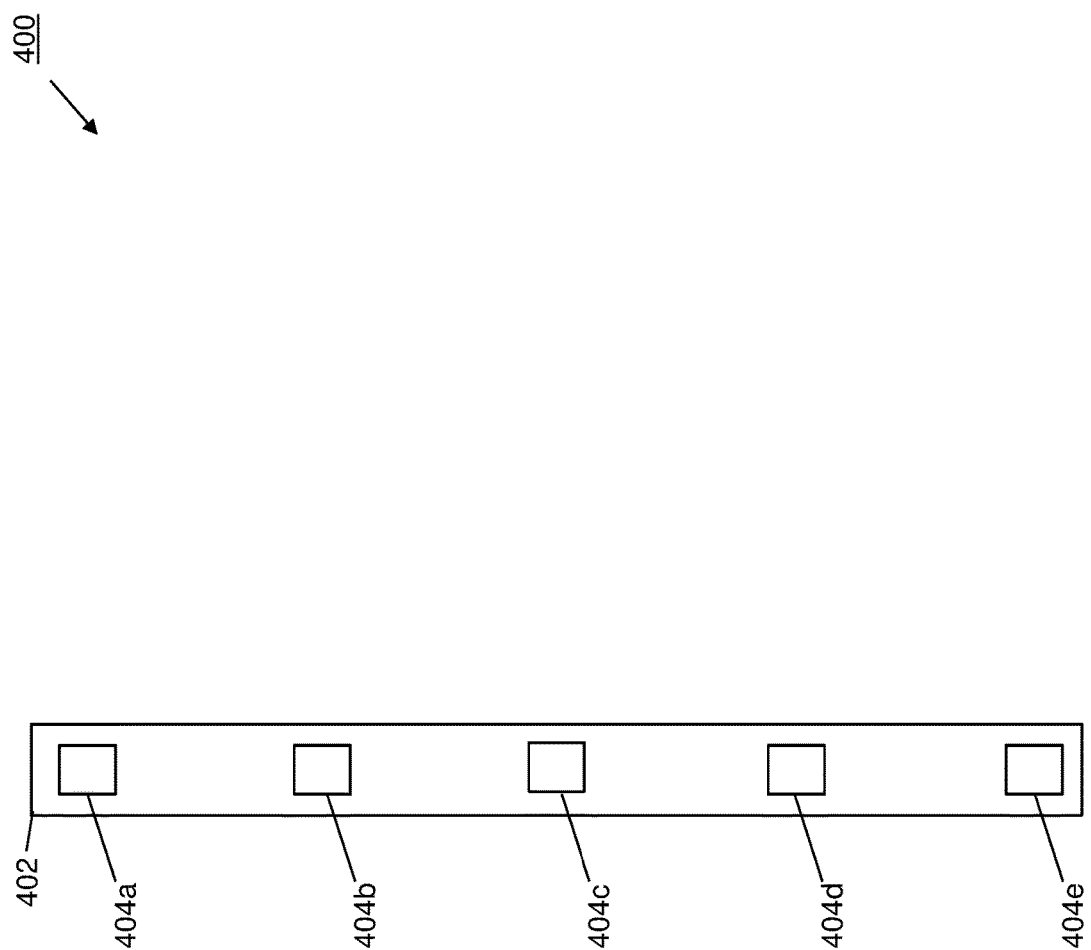

RACK SWITCH COUPLING SYSTEM

BACKGROUND

The present disclosure relates generally to information handling systems, and more particularly to coupling information handling systems to a switch in an information handling system rack.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage systems, and/or other computing devices, are often provided in a rack and coupled to each other and a network using one or more switch devices that are also provided in that rack. The coupling of computing devices to switch devices in a rack is accomplished via respective cables coupled between respective ports on the switch device(s) and respective ports on the computing devices, and one of skill in the art in possession of the present disclosure will recognize that as racks hold more and more computing devices, more and more cables may be utilized with that rack to provide those couplings. For example, in conventional racks that hold 4 switch devices positioned adjacent the top of the rack (i.e., Top of Rack (ToR) switch devices) and more than 40 computing devices positioned below those switch devices, upward of 160 separate cables may be utilized to couple the switch devices with those computing devices. In order to ensure efficient access to the computing devices and switch devices, cable management techniques are utilized that typically route the cables between the switch devices and the computing devices along one or more sides of the rack in a group or "bunch".

Such cable management techniques typically include the utilization of cable management/routing hardware, as well as the design and planning of cable routing strategies involving different length cables that allow the routing of any particular cable between a switch device and any particular computing device without providing that cable with a length that exceeds the cable routing distance (i.e., cable "slack" that must then be managed in some manner.) As such, cables utilized in the rack can be up to 2-3 feet longer than the shortest distance between the switch device and computing device they couple together in order to provide the desired cable routing path, which can result in relatively long cables being required for at least some of the computing devices provided in the rack. As will be appreciated by one of skill in the art in possession of the present disclosure, the conventional coupling and cable management techniques discussed above provide cabling that can obstruct airflow, activity indicator LEDs, and text on the computing devices, while making it cumbersome to add and remove cables to and from the rack due to the need to plan for and provide the cable routing discussed above. Furthermore, tracing any particular cable between a switch device and a computing device is difficult due to that cable being "bunched" or otherwise routed in a group of cables that run along a side of the rack, with the cabling between a switch device and computing devices that are positioned near the bottom of the rack (i.e., opposite the rack from that switch device) presenting particular cable tracing difficulties.

Accordingly, it would be desirable to provide a rack switch coupling system that addresses the issues discussed above.

SUMMARY

According to one embodiment, an Information Handling System (IHS) includes a chassis; a processing system that is located in the chassis; a memory system that is located in the chassis, coupled to the processing system, and that includes instructions that, when executed by the processing system, cause the processing system to perform switching operations; and a communication system that is located in the chassis, coupled to the processing system, and that includes a plurality of ports, wherein the chassis is configured to be positioned in a rack including a plurality of computing devices in a stacked orientation such that each of the plurality of ports is located adjacent a respective computing device and between a first plane corresponding to a top surface of that computing device and a second plane corresponding to a bottom surface of that computing device that is opposite the top surface.

BRIEF DESCRIPTION OF THE DRAWINGS

FIG. 4 is a schematic view illustrating an embodiment of a switch system that may provide the rack switch coupling system of the present disclosure.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
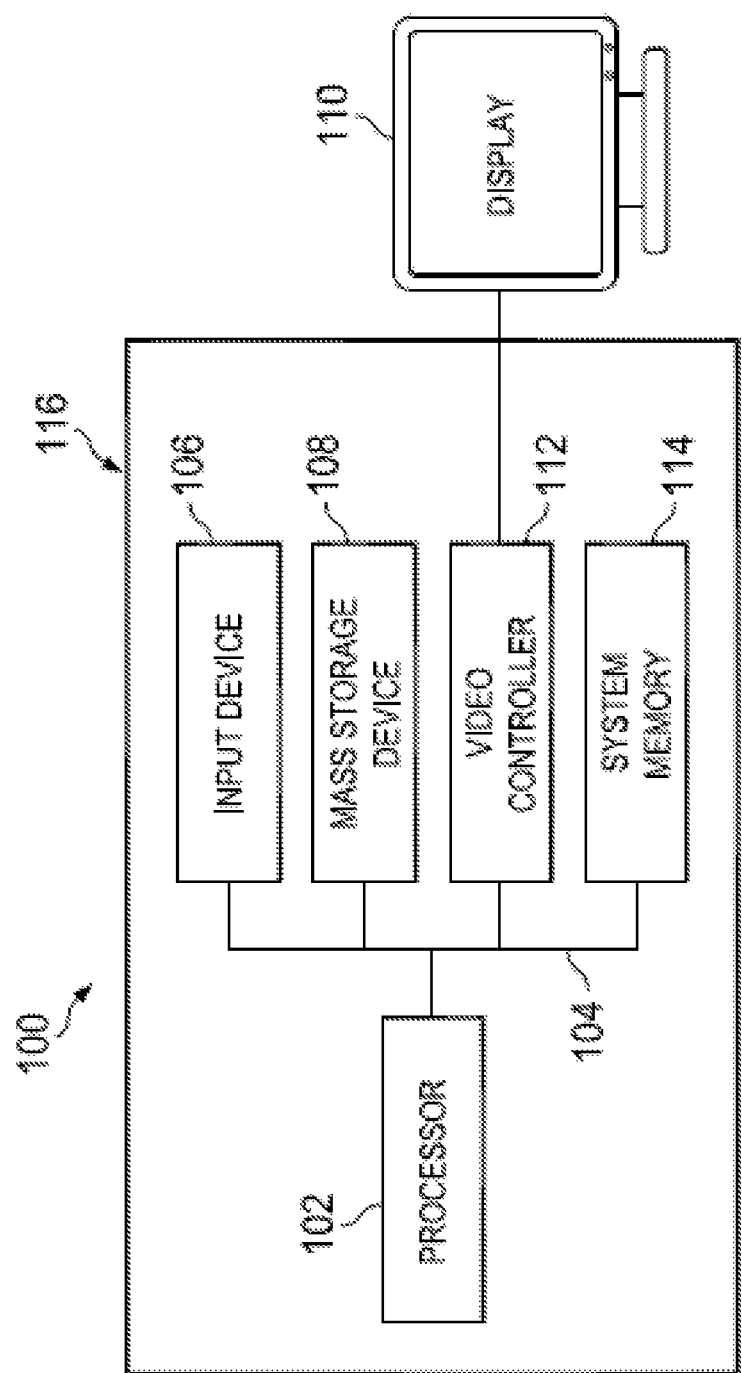
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
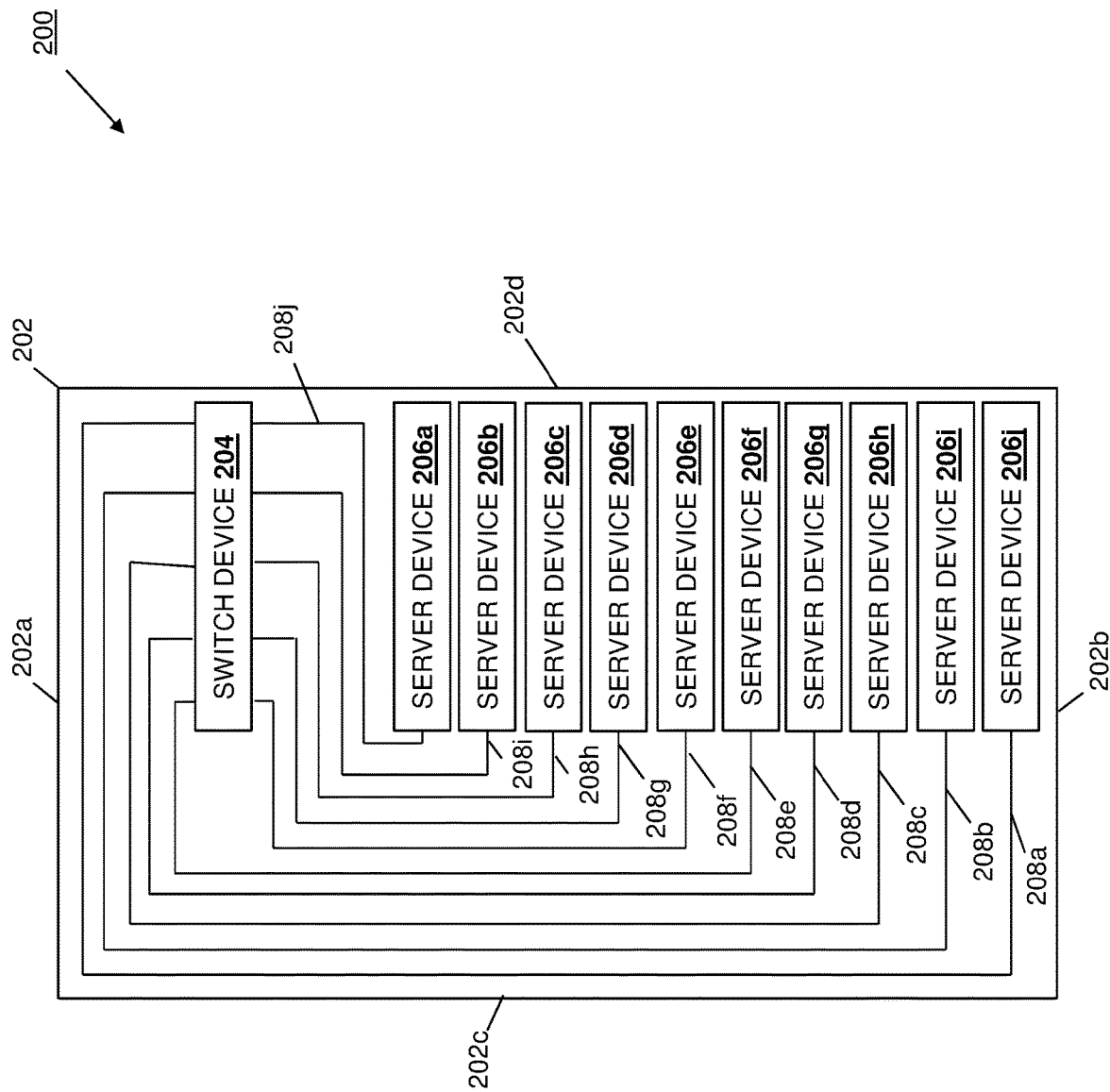
FIG. 2 is a schematic view illustrating an embodiment of a conventional rack switch coupling system.

Referring now to FIG. 2, an embodiment of a conventional rack switch coupling system 200 is illustrated for purposes of discussion of some of the benefits of the rack switch coupling system of the present disclosure. As illustrated in FIG. 2, the conventional rack switch coupling system 200 may include a rack 202 having a top wall 202a, a bottom wall 202b that is located opposite the rack 202 from the top wall, and a pair of opposing side walls 202c and 202d that extends between the top wall 202a and the bottom wall 202b. As would be understood by one of skill in the art in possession of the present disclosure, the top wall 202a, the bottom wall 202b, and the side walls 202c and 202d of the rack 202 may define a device housing between them, and the device housing illustrated FIG. 2 is not illustrated to scale in order to allow for an embodiment of a conventional cable routing technique to be clearly depicted. For example, FIG. 2 illustrates the device housing provided by the rack 202 housing a switch device 204 and a plurality of server devices 206a, 206b, 206c, 206d, 206e, 206f, 206g, 206h, 206i, and 206j in a stacked orientation (i.e., with the switch device 204 positioned adjacent the top wall 202a of the rack 202, the server device 206a positioned adjacent and below the switch device 204, the server device 206a positioned adjacent and below the server device 206b, and up to the server device 206j positioned adjacent the bottom wall 202j of the rack 202), and one of skill in the art in possession of the present disclosure will appreciate that the switch device 204 and server devices 206a-206j typically span the width of the rack 202 (e.g., from the side wall 202c to the side wall 202d), rather than the rack providing the additional space in the device housing that is illustrated in FIG. 2 as including cabling, discussed below.

As illustrated in FIG. 2, the conventional rack switch coupling system 200 couples each of the server devices 206a-j to the switch device 204 via at least one respective cable (e.g., one or more cables 208a connected to ports on the server device 206a and the switch device 204, one or more cables 208b connected to ports on the server device 206b and the switch device 204, one or more cables 208c connected to ports on the server device 206c and the switch device 204, one or more cables 208d connected to ports on the server device 206d and the switch device 204, one or more cables 208e connected to ports on the server device 206e and the switch device 204, one or more cables 208f connected to ports on the server device 206f and the switch device 204, one or more cables 208g connected to ports on the server device 206g and the switch device 204, one or more cables 208h connected to ports on the server device 206h and the switch device 204, one or more cables 208i connected to ports on the server device 206i and the switch device 204, and one or more cables 208j connected to ports on the server device 206j and the switch device 204.) Furthermore, as illustrated in FIG. 2, each of those cables 208a-208j may be routed from the port on the server device to which it is connected and to the side wall 202c, then adjacent to and along the side wall 202c towards the top wall 202a, and then back towards the port on the switch device 204 to which it is connected. Furthermore, the portions of the cables that are routed along the side wall 202c may be bundled together using a variety of cable management hardware.

As discussed above, conventional rack switch coupling systems like that illustrated in FIG. 2 require the design and planning of cable routing strategies involving different length cables that allow the routing of any particular cable between the switch device and any of the server devices 206a-206j without providing that cable with a length or "slack" that exceeds the cable routing distance and that then must be managed in some manner (e.g., the cable(s) 208j connecting the server device 206a to the switch device 204 are relatively much shorter than the cable(s) 208a connecting the server device 206j to the switch device 204) As such, the cables 208a-208j utilized in the rack 200 can be up to 2-3 feet longer than the shortest distance between the switch device and server device they couple together in order to provide the cable routing path along the side wall 202c, which can result in relatively long cables 208a being required for the server devices (e.g., the server device 206j) provided in the rack 200 adjacent its bottom wall 202b. As will be appreciated by one of skill in the art in possession of the present disclosure, the conventional coupling and cable management techniques illustrated in FIG. 2 make it cumbersome to add and remove cables to and from the rack 202 due to the need to plan for and provide the cable routing discussed above, and tracing any particular cable between a switch device and a server device is difficult due to that cable being "bunched" or otherwise routed in the group of cables that run along the side wall 202c of the rack 202, with the cabling 208a between the switch device 204 and server device 206j positioned near the bottom wall 202b of the rack 202 (i.e., opposite the rack 202 from the switch device 204) as presenting particular cable tracing difficulties.

Figure 3A:
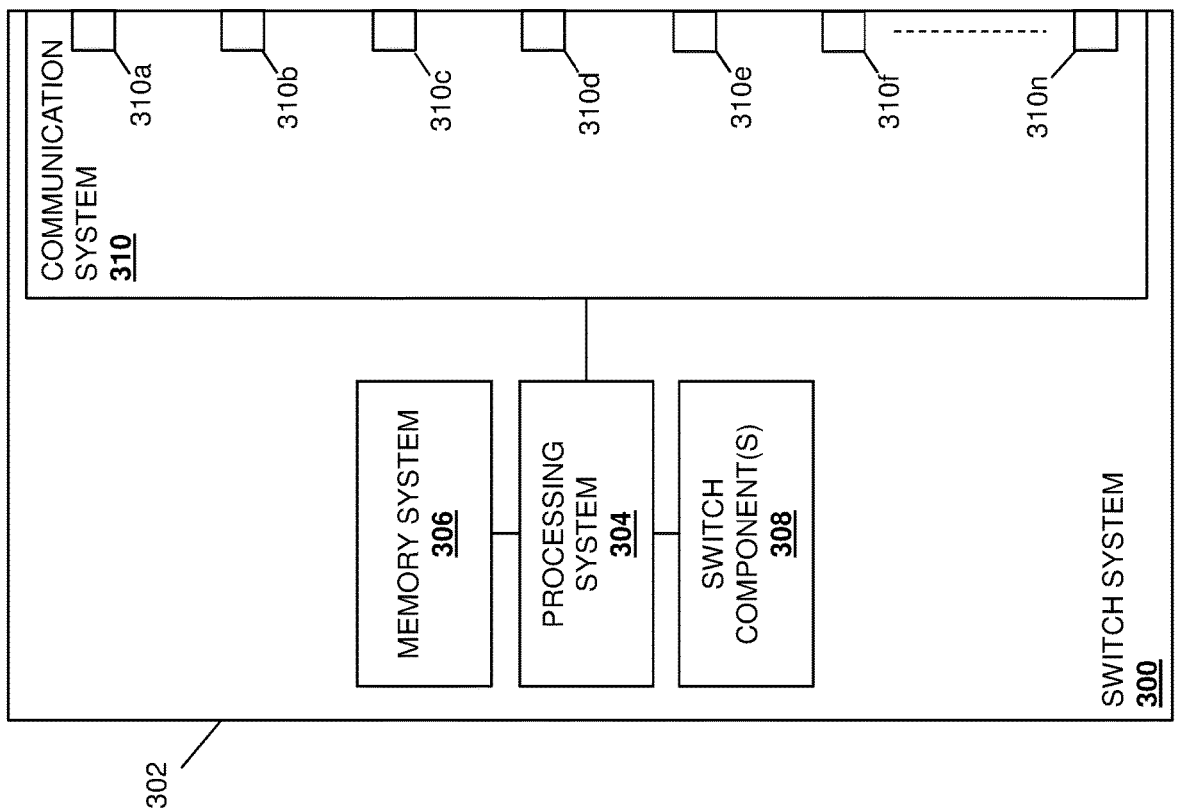
FIG. 3A is a schematic view illustrating an embodiment of a switch system that may provide the rack switch coupling system of the present disclosure.
Figure 3B:
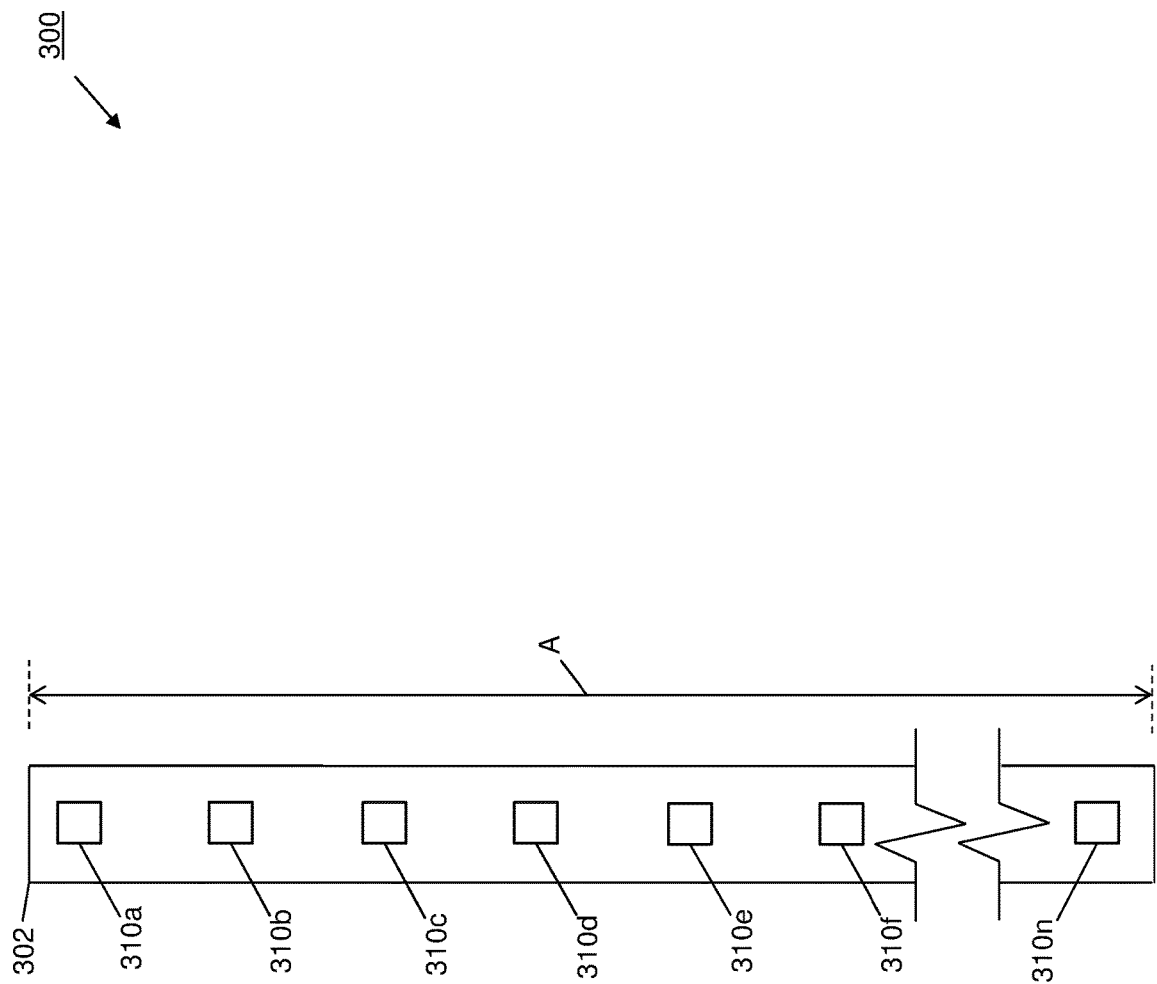
FIG. 3B is a schematic view illustrating an embodiment of the switch system of FIG. 3A.

Referring now to FIGS. 3A and 3B, an embodiment of a switch system 300 is illustrated that may provide the rack switch coupling system of the present disclosure. As such, the switch system 300 may be provided by the IHS 100 discussed above with reference to FIG. 1 and/or may include some or all of the components of the IHS 100, and in specific examples, may provide any of a variety of switching functionality that would be apparent to one of skill in the art in possession of the present disclosure. However, while illustrated and discussed as a switch system providing switching functionality, one of skill in the art in possession of the present disclosure will recognize that the functionality of the switch system 300 discussed below may be provided by other devices that are configured to operate similarly as the switch system 300 discussed below. In the illustrated embodiment, the switch system 300 includes a chassis 302 that houses or supports the components of the switch system 300, only some of which are illustrated and discussed below. In some examples, the chassis 302 may include a plurality of chassis walls that define a chassis enclosure that houses the components of the switch system 300. However, in other examples, the chassis 302 may include a circuit board (e.g., a motherboard) that supports the components of the switch system 300. Furthermore, as discussed below, the chassis 302 may include structures that support modular switch devices that include the components of the switch system 300. As such, one of skill in the art in possession of the present disclosure will appreciate that the chassis 302 of the switch system 300 may be provided in a variety of manners that will fall within the scope of the present disclosure as well.

For example, the chassis 302 may house or support a processing system 304 (e.g., one or more of the processors 102 discussed above with reference to FIG. 1, one or more Application Specific Integrated Circuits (ASICs), one or more Field Programmable Gate Arrays (FPGAs), one or more Complex Programmable Logic Devices (CPLDs), timing modules, switching fabrics, and/or other processing systems components that would be apparent to one of skill in the art in possession of the present disclosure.) The chassis 302 may also house or support a memory system 306 (e.g., one or more flash memory devices, one or more Dynamic Random Access Memory (DRAM) devices, and/or other memory system components that would be apparent to one of skill in the art in possession of the present disclosure) that is coupled to the processing system 304 and that may include instructions that, when executed by the processing system 304, cause the processing system 304 to perform the switching operations and/or other functionality of the switching systems discussed below. As illustrated in FIG. 3A, the switch system 300 may also house or support one or more other switch component(s) 308 that may include fans or other air moving devices, storage systems, PHYsical layer devices (PHYs), and/or other switch components that would be apparent to one of skill in the art in possession of the present disclosure.

The chassis 302 may also house or support a communication system 310 that is coupled to the processing system 304 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 310 may include a plurality of ports 310a, 310b, 310c, 310d, 310e, 310f, and up to 310n. As illustrated in FIG. 3B, the ports 310a-310n may be positioned along a height A of the chassis 302 in a spaced-apart, stacked orientation relative to each other, with the height A provided as approximately equal to the height of a rack (e.g., the rack 202 illustrated in FIG. 2) in which the switch system 300 will be used, and the spacing and location of the ports 310a-310n provided such that each respective port is located adjacent a corresponding server device (e.g., the server devices 206a-206j) in the rack in which the switch system 300 will be used. However, as discussed below, the switch system 300 illustrated in FIGS. 3A and 3B may include a chassis that extends only along a portion of a height the rack in which it will be used (e.g., along half of the height of that rack, along one-third of the height of that rack, along a quarter of the height of that rack, etc.) while remaining with the scope of the present disclosure as well. Furthermore, while a specific switch system 300 has been illustrated, one of skill in the art in possession of the present disclosure will recognize that switch systems (or other devices and/or systems operating according to the teachings of the present disclosure in a manner similar to that described below for the switch system 300) may include a variety of components and/or component configurations for providing conventional switching device functionality, as well as the functionality discussed below, while remaining within the scope of the present disclosure as well.

Referring now to FIG. 4, a switch system 400 providing one configuration of the switch system of the present disclosure is illustrated. As such, the switch system 400 may be provided by the switch system 300 discussed above with reference to FIGS. 3A and 3B, and/or may include some or all of the components of the switch system 300. As such, the switch system 400 includes a chassis 402 that may be substantially similar to the chassis 302 discussed above with reference to FIGS. 3A and 3B. The embodiment of the switch system illustrated in FIG. 4 illustrates how switch system components 404a, 404b, 404c, 404d, and up to 404e (e.g., processing systems such as ASICs, switching fabrics, timing modules, FPGAs, CPLDs, etc.; memory systems such as flash memory devices, DRAM devices, etc.; and/or other switch components known in the art) may be provided in and/or on the chassis 402 in a linear, distributed configuration that allows the switch system 400 to span the height of the rack in which it will be used.

As such, in some examples, processing system components included in the switch system 400 such as switching ASICs may be positioned in a distributed orientation on the chassis 402. For example, in a switch system 400 that includes a single switching ASIC, that switching ASIC may be substantially centrally located on the chassis 402 (e.g., as illustrated for switch system component 404c in FIG. 4.) However, in a switch system with two switching ASICs, a first switching ASIC may be located one-quarter along the height of the chassis 402 (e.g., as illustrated for switch system component 404b in FIG. 4), and a second switching ASIC may be located three-quarters along the height of the chassis 402 (e.g., as illustrated for switch system component 404d in FIG. 4). Furthermore, FPGA's, CPLDs, switching fabrics, timing modules, flash devices, DRAM devices, and/or other switch components may be distributed along the height of the chassis 402 in any manner that allows for the switching functionality described herein, and one of skill in the art in possession of the present disclosure will appreciate that fan device placement in the chassis 402 of the switch system 400 may be optimized by positioning those fan devices immediately adjacent the switch components that need cooling (e.g., the ASIC(s) discussed above), rather than having those fan devices provide airflow over several switch components that heat that airflow prior to it reaching the switch component(s) that are most in need of cooling (as is done in conventional switch systems.) As will be appreciated by one of skill in the art in possession of the present disclosure, the communication system and its ports (e.g., similar to the communication system 310 and ports 310a-310n discussed above with reference to FIG. 3) are not illustrated in FIG. 4, but may be positioned along a height of the chassis 402 in a spaced-apart, stacked orientation relative to each other in substantially the same manner as discussed above with reference to FIGS. 3A and 3B and, as discussed below, the teachings of the present disclosure may be utilized to couple the switching components 404a-404e to ports 310a-310n (e.g., particularly for ports that are relatively far away from the switch components on the chassis 402.)

Figure 5:
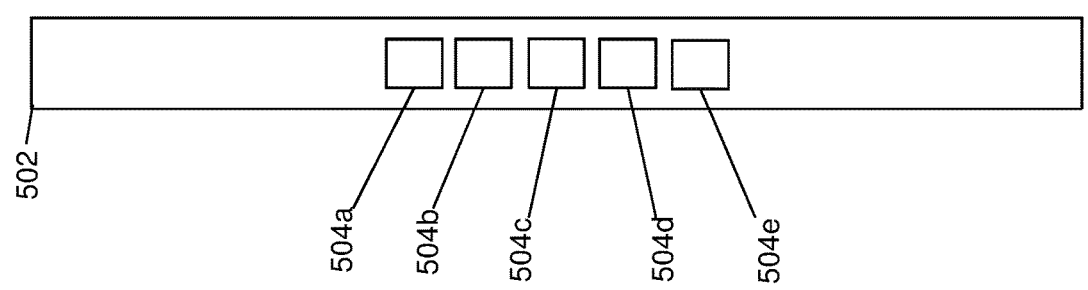
FIG. 5 is a schematic view illustrating an embodiment of a switch system that may provide the rack switch coupling system of the present disclosure.

Referring now to FIG. 5, a switch system 500 providing one configuration of the switch system of the present disclosure is illustrated. As such, the switch system 500 may be provided by the switch system 300 discussed above with reference to FIGS. 3A and 3B, and/or may include some or all of the components of the switch system 300. As such, the switch system 500 includes a chassis 502 that may be substantially similar to the chassis 302 discussed above with reference to FIGS. 3A and 3B. The embodiment of the switch system illustrated in FIG. 5 illustrates how switch system components 504a, 504b, 504c, 504d, and up to 504e (e.g., processing systems such as ASICs, switching fabrics, timing modules, FPGAs, CPLDs, etc.; memory systems such as flash memory devices, DRAM devices, etc.; and/or other switch components known in the art) may be provided in and/or on the chassis 502 in a centralized configuration that allows the switch system 500 to span the height of the rack in which it will be used.

As such, in some examples, processing system components included in the switch system 500 such as switching ASICs may be positioned in a centralized orientation on the chassis 502 and relatively close to each other. Furthermore, FPGA's, CPLDs, switching fabrics, timing modules, flash devices, DRAM devices, and/or other switch components may be positioned in the centralized orientation on the chassis 402 and relatively closely to each other in any manner that allows for the switching functionality described herein. As will be appreciated by one of skill in the art in possession of the present disclosure, the communication system and its ports (e.g., similar to the communication system 310 and ports 310a-310n discussed above with reference to FIG. 3) are not illustrated in FIG. 4, but may be positioned along a height of the chassis 402 in a spaced-apart, stacked orientation relative to each other in substantially the same manner as discussed above with reference to FIGS. 3A and 3B and, as discussed below, the teachings of the present disclosure may be utilized to couple the switching components 504a-504e to ports 310a-310n (e.g., particularly for ports that are relatively far away from the switch components on the chassis 402.) As will be appreciated by one of skill in the art in possession of the present disclosure, combinations of the distributed and centralized switch component configurations discussed above with reference to FIGS. 4 and 5 may be provided in the switch system of the present disclosure while remaining within the scope of the present disclosure as well.

Figure 6:
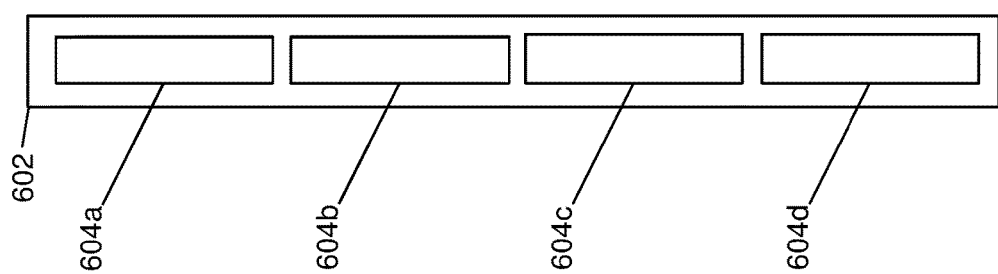
FIG. 6 is a schematic view illustrating an embodiment of a switch system that may provide the rack switch coupling system of the present disclosure.

Referring now to FIG. 6, a switch system chassis 600 is illustrated that may provide for a modular configuration of the switch system of the present disclosure. As such, the switch system chassis 600 may be utilized with multiple switch systems 300 discussed above with reference to FIGS. 3A and 3B. For example, the switch system chassis 600 includes a base 602 that defines a plurality of modular switch device housings 604a, 604b, 604c, and up to 604d, each of which may be configured to house a modular switch device that may be provided by embodiments of the switch system 300 discussed above with reference to FIGS. 3A and 3B. The embodiment of the switch system chassis 600 illustrated in FIG. 6 illustrates how a switch system chassis may be provided that houses multiple modular switch devices that each may include a communication system and its ports (e.g., similar to the communication system 310 and ports 310a-310n discussed above with reference to FIG. 3) that, when the module switch devices are positioned in the respective modular switch device housings 604a-604d, are positioned along a height of the base 602 in a spaced-apart, stacked orientation relative to each other in substantially the same manner as discussed above with reference to FIGS. 3A and 3B.

As such, multiple modular switch devices (i.e., multiple switch systems 300 that each include a height that spans some portion of the height of the rack they will be used in) may be stacked using the switch system chassis 600, and in some embodiments may include modular switch devices with the same capabilities/functionality, while in other embodiments may include different capabilities/functionality (e.g., modular switch devices provided according to the Institute of Electrical and Electronics Engineers (IEEE) 802.3an-2006 standard (10GBASE-T), modular switch devices provided according to the IEEE 802.3ab standard (1000BASE-T), modular switch devices with switch expander ports, modular switch devices with Small Form-factor Pluggable (SFP/SFP+) capabilities/functionality, etc.) Thus, one of skill in the art in possession of the present disclosure will appreciate that, in some embodiments, the switch system chassis 600 may include couplings and/or connections between the modular switch devices housings 604a-604d (e.g., via a backplane in the switch system chassis 600) that may allow the modular switch devices provided therein to communication with each other.

Figure 7:
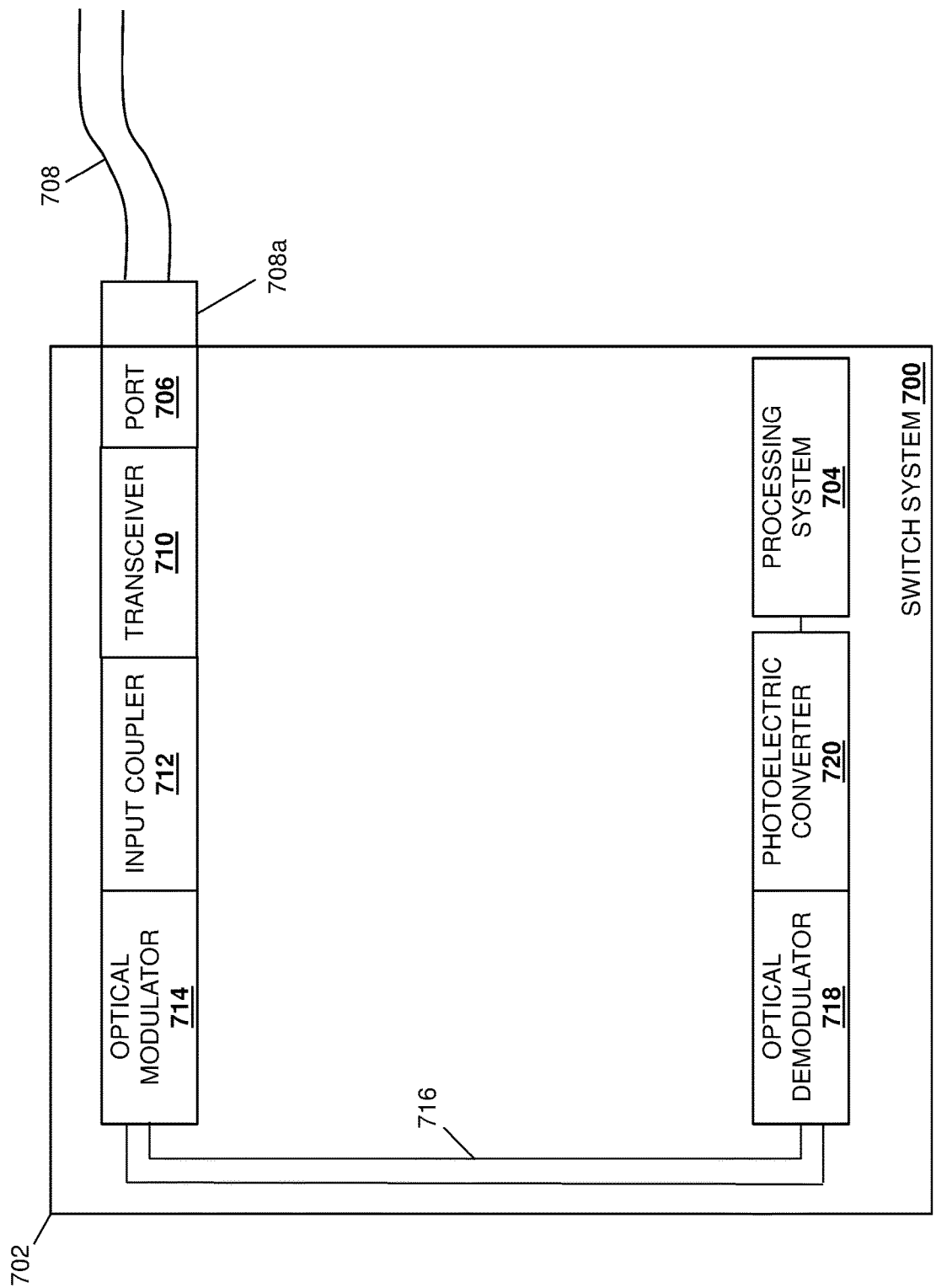
FIG. 7 is a schematic view illustrating an embodiment of a switch system that may provide the rack switch coupling system of the present disclosure.

Referring now to FIG. 7, an embodiment of a switch system 700 is illustrated that includes processing system/port coupling features that may be provided in any of the switch systems 300, 400, 500, and 600 (or combinations thereof) discussed above. The inventors of the present disclosure have found that the height of the switch system of the present disclosure can present some difficulties in the transmission of signals between ports on the switch system and the processing system(s) provided in the switch system (e.g., particularly with regard to the transmission of such signals via traces on a circuit board that can experience degradation when transmitted relatively long distances), and thus the switch system 700 provides an embodiment that allows for the transmission of such signals via silicon photonics. The embodiment of the switch system 700 includes a chassis 702 that may be the any of the chassis 302, 402, 502, and 602 discussed above with regards to the switch systems 300, 400, 500, and 600, respectively. The chassis 702 houses or supports a processing system 704 that may be the processing system 304 provided with the switch system 300, and a port 706 that may be any of the ports 310a-310n in the communication system 310 provided with the switch system 300. As illustrated in FIG. 7, a cable 708 (e.g., a fibre optic cable) may be coupled to the port 706 (e.g., a fibre optic port) via a cable connector 708a (e.g., a fibre optic connector), and one of skill in the art in possession of the present disclosure will appreciate that the cable 708 may be connected on an opposing, unillustrated end to a server device as described herein.

In the illustrated embodiment, a transceiver 710 is coupled to the port 706 and may be provided by, for example, a pass-through transceiver that is configured to receive optical signals transmitted via the cable 708 and the port 706, and pass those optical signals to an input coupler 712. The input coupler 712 may couple the transceiver 710 to an optional optical modulator 714, and may be configured to transmit the optical signals provided by the transceiver 710 to the optional optical modulator 714. As will be appreciated by one of skill in the art in possession of the present disclosure, the optional optical modulator 714 may be configured to modulate the optical signals (e.g., to overcome interference issues when the signal is one of many that are being transmitted along a common optical transmission medium) and transmit the optical signals via an optical transmission medium such as the optical waveguide 716 illustrated in FIG. 7. However, the optional optical modulator 714 may be removed, and the input coupler 712 may provide optical signals directly to the optical waveguide 716 while remaining within the scope of the present disclosure as well.

The optical waveguide 716 extends between the optional optical modulator 714 and an optional optical demodulator 718 that maybe located relatively physical close to the processing system 704 in the chassis 702, and that is configured to receive optical signals transmitted via the optical waveguide 716 and demodulate those optical signals in the event they have been modulated by the optional optical modulator 714. As such, the optional optical demodulator 708 may be removed from the switch system 700 while remaining within the scope of the present disclosure as well. A photoelectric converter 720 is coupled to the optical demodulator 718 (or directly to the optical waveguide 716 in the event the optional optical demodulator 718 is not present), and may be configured to convert the optical signals received from the optical demodulator 718 to electrical signals, and provide those electrical signals to the processing system 704 for processing. While one of skill in the art in possession of the present disclosure will recognize that the processing system 704 is illustrated as receiving and processing electrical signals, a processing system that is configured to process optical signals may replace the processing system 704 in the switch system 700, allowing from the removal of the photoelectrical converter 720 and the receiving of optical signals by that processing system directly from the optical demodulator 718 or the optical waveguide 716.

Figure 8:
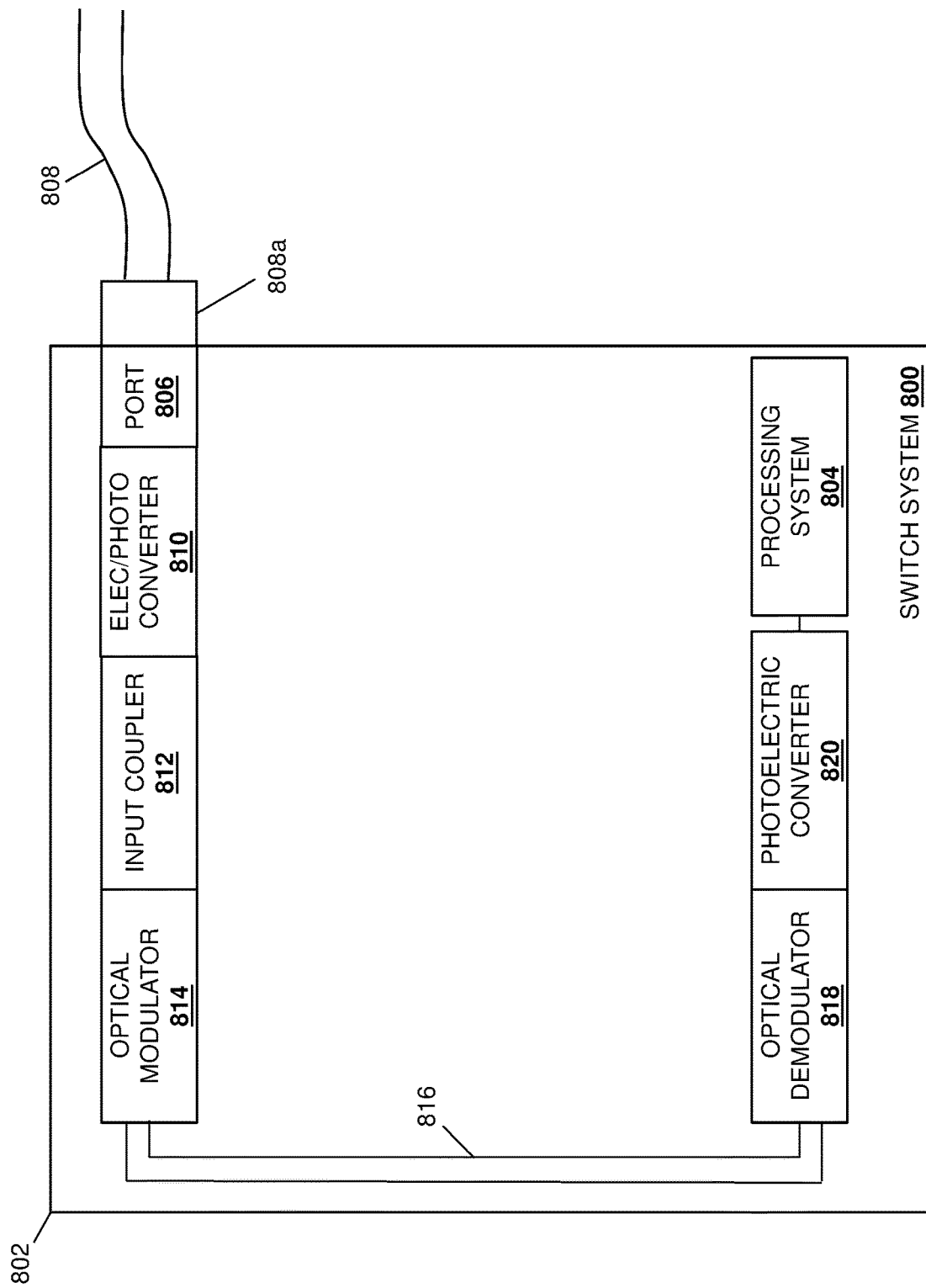
FIG. 8 is a schematic view illustrating an embodiment of a switch system that may provide the rack switch coupling system of the present disclosure.

Referring now to FIG. 8, an embodiment of a switch system 800 is illustrated that includes processing system/port coupling features that may be provided in any of the switch systems 300, 400, 500, and 600 discussed above. As discussed above, the inventors of the present disclosure have found that the height of the switch system of the present disclosure can present some difficulties in the transmission of signals between ports on the switch system and the processing system provided in the switch system (e.g., particularly with regard to the transmission of such signals via traces on a circuit board that can experience degradation when transmitted relatively long distances), and thus the switch system 800 provides an embodiment that allows for the transmission of such signals via silicon photonics. The embodiment of the switch system 800 includes a chassis 802 that may be the any of the chassis 302, 402, 502, and 602 discussed above with regards to the switch systems 300, 400, 500, and 600, respectively. The chassis 802 houses or supports a processing system 804 that may be the processing system 304 provided with the switch system 300, and a port 806 that may be any of the ports 310a-310n in the communication system 310 provided with the switch system 300. As illustrated in FIG. 8, a cable 808 (e.g., an Ethernet cable) may be coupled to the port 806 (e.g., an Ethernet port) via a cable connector 808a (e.g., an Ethernet connector), and one of skill in the art in possession of the present disclosure will appreciate that the cable 808 may be connected on an opposing, unillustrated end to a server device as described herein.

In the illustrated embodiment, an electric-to-photo converter 810 may be coupled to the port 806 and configured to convert electrical signals received via the cable 808 and from the port 806 to optical signals, and provide those optical signals to an input coupler 812. The input coupler 812 may couple the electric-to-photo converter 810 to an optional optical modulator 814, and may be configured to transmit the optical signals received from the electric-to-photo converter 810 to the optional optical modulator 814. As will be appreciated by one of skill in the art in possession of the present disclosure, the optical modulator 814 may be configured to modulate the optical signals (e.g., to overcome interference issues when the signal is one of many that are being transmitted along a common optical transmission medium) and transmit the optical signals via an optical transmission medium such as the optical waveguide 816 illustrated in FIG. 8. However, the optional optical modulator 814 may be removed, and the input coupler 812 may provide optical signals directly to the optical waveguide 816 while remaining within the scope of the present disclosure as well.

The optical waveguide 816 extends between the optional optical modulator 814 and an optional optical demodulator 818 that is located relatively physically close to the processing system 804, and that is configured to receive optical signals transmitted via the optical waveguide 816 and demodulate those optical signals in the event they have been modulated by the optional optical modulator 814. As such, the optional optical demodulator 808 may be removed from the switch system 800 while remaining within the scope of the present disclosure as well. A photoelectric converter 820 is coupled to the optical demodulator 818 (or directly to the optical waveguide 816 in the event the optional optical demodulator 818 is not present) and configured to convert the optical signals received from the optical demodulator 818 to electrical signals, and provide those electrical signals to the processing system 804 for processing. While one of skill in the art in possession of the present disclosure will recognize that the processing system 804 is illustrated as receiving and processing electrical signals, a processing system that is configured to process optical signals may replace the processing system 804 in the switch system 800, allowing from the removal of the photoelectrical converter 820 and the receiving of optical signals by that processing system directly from the optical demodulator 818 or the optical waveguide 816.

Figure 9:
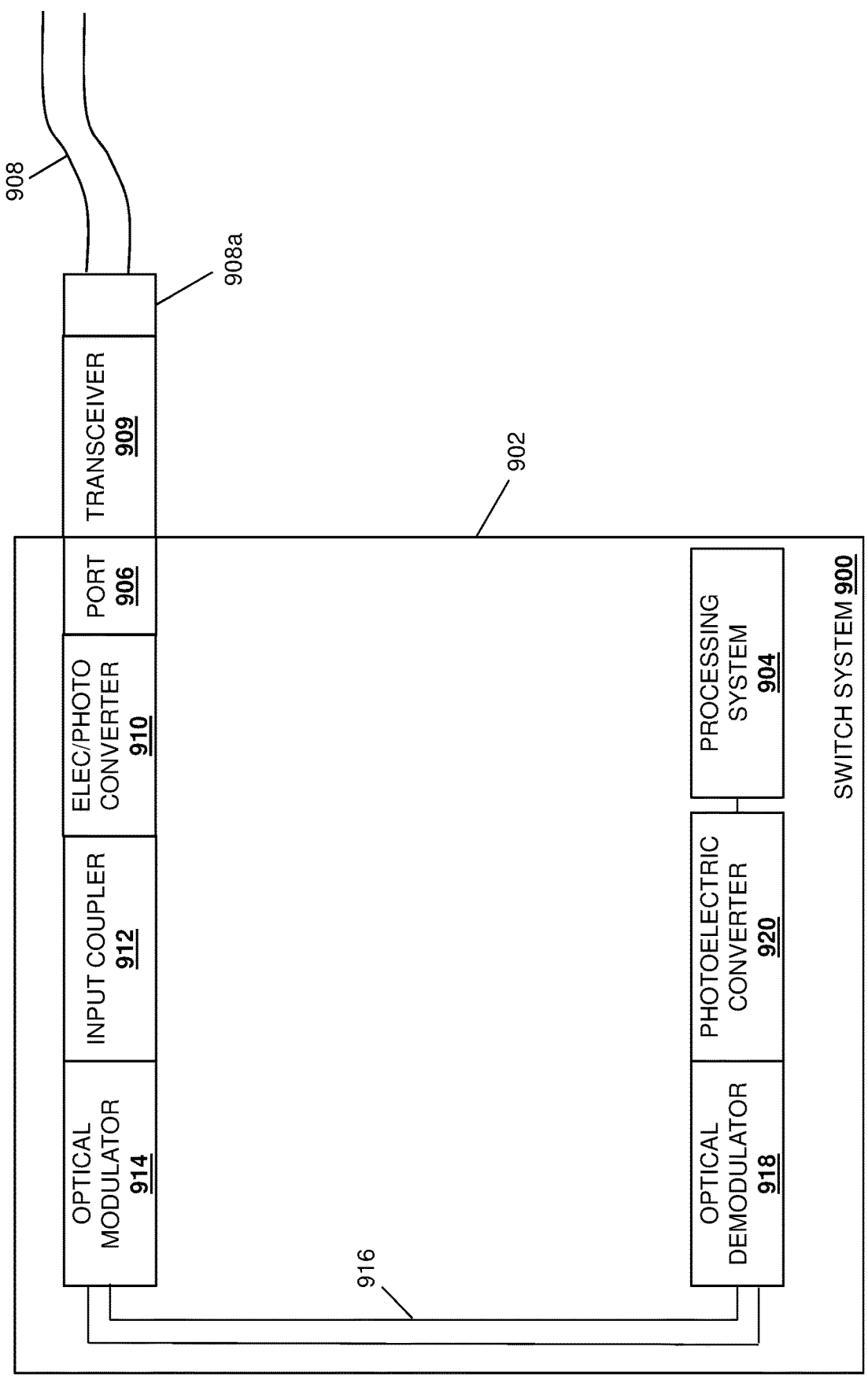
FIG. 9 is a schematic view illustrating an embodiment of a switch system that may provide the rack switch coupling system of the present disclosure.

Referring now to FIG. 9, an embodiment of a switch system 900 is illustrated that includes processing system/port coupling features that may be provided in any of the switch systems 300, 400, 500, and 600 discussed above. As discussed above, the inventors of the present disclosure have found that the height of the switch system of the present disclosure can present some difficulties in the transmission of signals between ports on the switch system and the processing system provided in the switch system (e.g., particularly with regard to the transmission of such signals via traces on a circuit board that can experience degradation when transmitted relatively long distances), and thus the switch system 900 provides an embodiment that allows for the transmission of such signals via silicon photonics. The embodiment of the switch system 900 includes a chassis 902 that may be the any of the chassis 302, 402, 502, and 602 discussed above with regards to the switch systems 300, 400, 500, and 600, respectively. The chassis 902 houses or supports a processing system 904 that may be the processing system 304 provided with the switch system 300, and a port 906 that may be any of the ports 310a-310n in the communication system 310 provided with the switch system 300. As illustrated in FIG. 9, a cable 908 (e.g., a fibre optic cable) may be coupled to the port 906 (e.g., a fibre optic port) via a cable connector 908a (e.g., a fibre optic connector), and one of skill in the art in possession of the present disclosure will appreciate that the cable 908 may be connected on an opposing, unillustrated end to a server device as described herein.

In the illustrated embodiment, a transceiver 909 couples the cable 908 to the port 906, and may be configured to convert optical signals transmitted by the cable 908 to electrical signals, and provide those electrical signals to the port 906. An electric-to-photo converter 910 may be coupled to the port 906 and configured to convert the electrical signals received from the port 806 to optical signals, and provide those optical signals to an input coupler 912. The input coupler 912 may couple the electric-to-photo converter 910 to an optional optical modulator 914, and may be configured to transmit the optical signals received from the electric-to-photo converter 910 to the optional optical modulator 914. As will be appreciated by one of skill in the art in possession of the present disclosure, the optical modulator 914 may be configured to modulate the optical signals (e.g., to overcome interference issues when the signal is one of many that are being transmitted along a common optical transmission medium) and transmit the optical signals via an optical transmission medium such as the optical waveguide 916 illustrated in FIG. 9. However, the optional optical modulator 914 may be removed, and the input coupler 912 may provide optical signals directly to the optical waveguide 916 while remaining within the scope of the present disclosure as well.

The optical waveguide 916 extends between the optional optical modulator 914 and an optional optical demodulator 918 that is located relatively close to the processing system 904, and that is configured to receive optical signals transmitted via the optical waveguide 916 and demodulate those optical signals in the event they have been modulated by the optional optical modulator 914. As such, the optional optical demodulator 908 may be removed from the switch system 900 while remaining within the scope of the present disclosure as well. A photoelectric converter 920 is coupled to the optical demodulator 918 (or directly to the optical waveguide 916 in the event the optional optical demodulator 918 is not present) and configured to convert the optical signals received from the optical demodulator 918 to electrical signals, and provide those electrical signals to the processing system 904 for processing. While one of skill in the art in possession of the present disclosure will recognize that the processing system 904 is illustrated as receiving and processing electrical signals, a processing system that is configured to process optical signals may replace the processing system 904 in the switch system 900, allowing from the removal of the photoelectrical converter 920 and the receiving of optical signals by that processing system directly from the optical demodulator 918 or the optical waveguide 916.

As will be appreciated by one of skill in the art in possession of the present disclosure, the switch system of the present disclosure may be provided in racks that can exceed six feet in height, and thus the physical distance between any processing system in the switch system and any particular port in the switch system may be several feet. As such signal integrity issues may exists if signals are transmitted within the switch system using traditional processing system/port coupling methods (e.g., traces on a motherboard), particular with regard to signals transmitted by a processing system to the ports that are furthest from that processing system, and the silicon photonic techniques described above with reference to the switch systems 700, 800, and 900 may be provided in order to couple at least some of the ports in the switch system to the processing systems in that switch system.

As such, the switch system of the present disclosure may be provided with a motherboard and traces coupling at least one of its processing systems to at least some ports that are close enough to that processing system so as to not introduce signal integrity issues, while the silicon photonic techniques discussed above may be utilized to couple that processing system to at least some of the other ports (e.g., with the optical waveguide extending along the majority of the distance between the port and the processing system to transit signals between the two.) However, the silicon photonic techniques described herein may couple all of the ports on the switch system to the processing systems in that switch system while remaining within the scope of the present disclosure as well. Further still, one of skill in the art in possession of the present disclosure will appreciate that the optical transmission medium described above with respect to the switch systems 700, 800, and 900 (e.g., the optical waveguides 616, 716, and 816) may be provided for each processing system/port connection, or provided for multiple processing system/port connections (e.g., while using the modulation described above to distinguish optical signals that are to be provided for different ports.) As such, a wide variety of modification and combination of the embodiments discussed above is envisioned as falling within the scope of the present disclosure.

In a specific example utilizing a 42 U rack that is approximately 6 feet tall, an embodiment of the switch system of the present disclosure may be 6 feet tall as well, with a switching ASIC and/or other switching components located centrally along its height, providing approximately 3 feet of distance between that switching ASIC and the ports located near the top wall and bottom wall of the rack. As such, approximately 3 foot long optical waveguides may be utilized in the switch system to couple the switching ASIC to those ports. However, when redundant switching ASICs are provided in the switch system, the length of the optical waveguides may be reduced. For example, in a two switching ASIC switch system, a first switching ASIC may be located 18 inches/1.5 feet from the top wall of the rack, and a second switching ASIC may be located 18 inches/¼ feet from the bottom of the rack, requiring 18 inch/1.5 foot long optical waveguides for the ports further from each of those switching ASICs.

Figure 10:
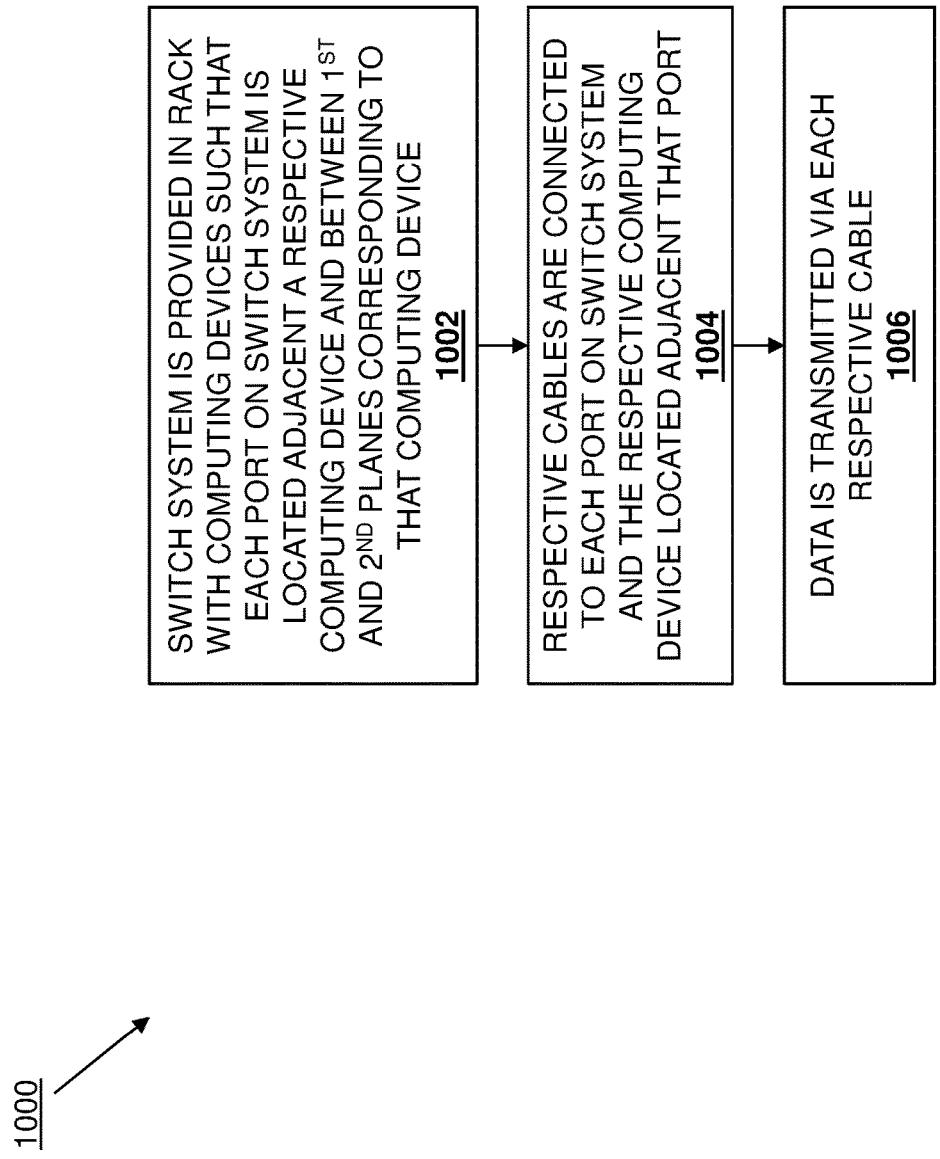
FIG. 10 is a flow chart illustrating an embodiment of a method for coupling a switch device in a rack.

Referring now to FIG. 10, an embodiment of a method 1000 for coupling a switch device in a rack is illustrated. As discussed below, the systems and methods of the present disclosure provide a switch system that extends at least partially along the height of a rack, with ports on that switch system located adjacent each computing device in that rack, eliminating the need for any substantial cable routing of the cables between those computing devices and ports and the issues associated with such cable routing. For example, a rack may include a plurality of computing devices that are positioned in the rack in a stacked orientation, with each of the computing devices including a top surface that corresponds with a first plane associated with that computing device, and a bottom surface that is located opposite that computing device from the top surface and that corresponds with a second plane associated with that computing device. A switch system positioned in the rack may include respective ports cabled to each of the plurality of computing devices, with each of the respective ports located adjacent the computing device to which it is cabled and between the first plane and the second plane associated with that computing device. As will be appreciated by one of skill in the art in possession of the present disclosure, the switch system of the present disclosure greatly reduces the length of the cables required to couple the computing devices to the switch system, thus reducing airflow issues introduce by conventional cables, reducing the difficulties in adding/removing computing devices to the rack and/or tracing the connection between the switch device and any particular computing device, and providing other benefits that will be apparent to one of skill in the art in possession of the present disclosure.

The method 1000 begins at block 1002 where a switch system is provided in a rack with computing devices such that each port on the switch system is located adjacent a respective computing device and between first and second planes corresponding to that computing device. In an embodiment, at block 1002, the switch system 300 discussed above with reference to FIGS. 3A and 3B may be provided in a rack including a plurality of computing devices. With reference to FIG. 11, an embodiment of a rack 1100 is illustrated that includes a plurality of server devices 1102a, 1102b, 1102c, 1102d, 1102e, 1102f, 1102g, 1102h, 1102i, 1102j, 1102k, 1102l, 1102m, and 1102n. However, while illustrated and discussed as including server devices 1102a-1102n, one of skill in the art in possession of the present disclosure will appreciate that the rack 1100 may include storage systems and/or other computing devices while remaining within the scope of the present disclosure as well. In some embodiments, the rack 1100 may be a conventional rack that is similar to the rack 200 discussed above with reference to FIG. 2, but with modifications necessary to couple with the switch system of the present disclosure. For example, many conventional racks are 1070 millimeters deep and 600 millimeters wide, and one of skill in the art in possession of the present disclosure will appreciate how the switch system of the present disclosure may be designed to fit in such racks (or modified versions of such racks.)

In other examples, the rack 1100 may be provided by newer rack designs that are being developed (e.g., NetShelter SX series racks available from Schneider Electric of Rueil-Malmaison, France) to provide additional space (both front-to-back and side-to-side) in the rack, offering up to 1200 millimeters of depth and/or up to 750 millimeters of width, and one of skill in the art in possession of the present disclosure will appreciate how the switch system of the present disclosure may be designed to fit in such racks. However, while a few specific examples have been provided, one of skill in the art in possession of the present disclosure will appreciate that the rack 1100 may be provided to couple with the switch system of the present disclosure in a variety of manners that will fall within the scope of the present disclosure as well. As such, the rack 1100 may include features for coupling to and securing both the server devices 1102a-1102n and the switch system of the present disclosure.

Figure 11A:
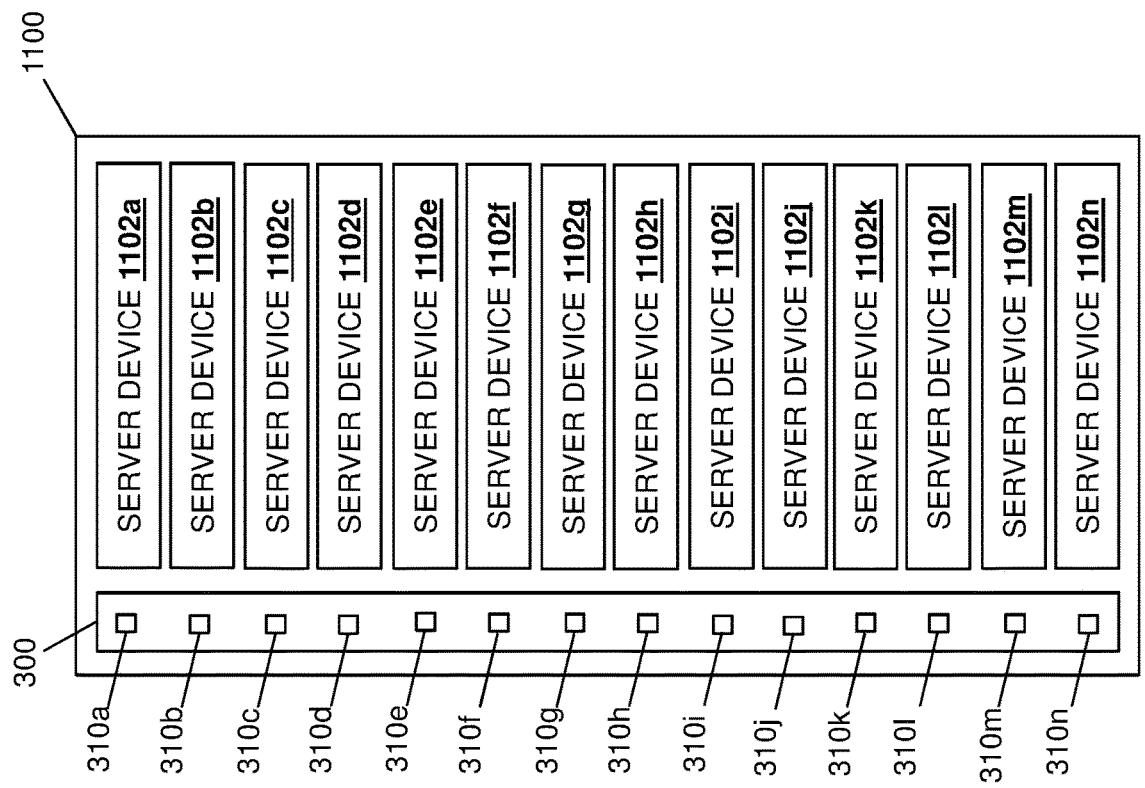
FIG. 11A is a schematic view illustrating an embodiment of the switch system of FIGS. 3A and 3B located in a rack during the method of FIG. 10 to provide the rack switch coupling system of the present disclosure.
Figure 11B:
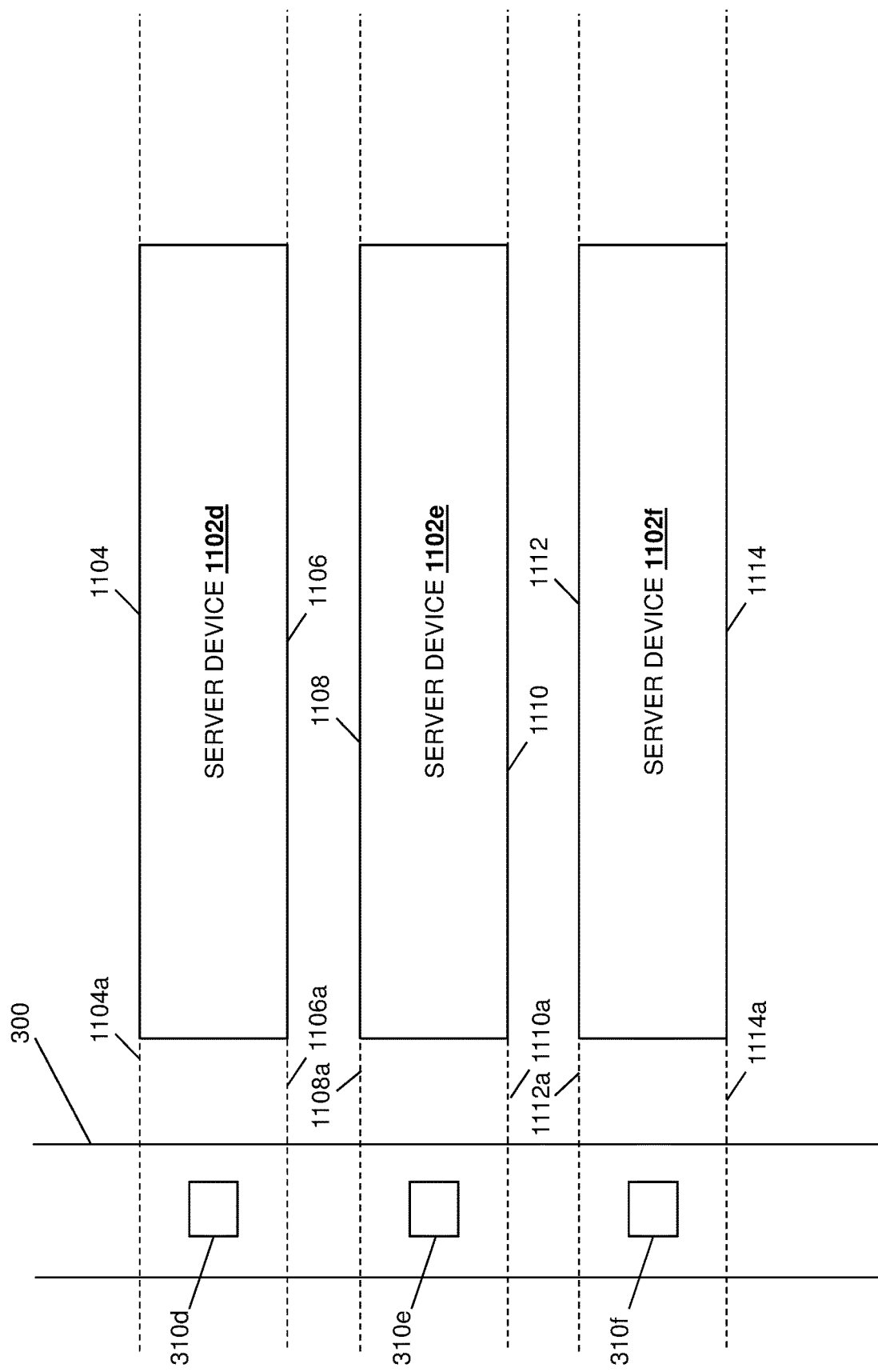
FIG. 11B is a schematic view illustrating an embodiment of some of the ports on the switch system of FIG. 11A located respective server devices provided in the rack of FIG. 11A.

FIGS. 11A and 11B illustrate the switch system 300 provided in the rack 1100 and, as can be seen in the illustrated embodiment, the switch system 300 may span the entire height of the rack 1100, with each port 310a-310n on the switch system 300 located adjacent a respective server device 1102a-n. For example, FIG. 11B illustrates how the server device 1102d may include a top surface 1104 that corresponds a top plane 1104a for that server device 1102d, and a bottom surface 1106 that corresponds to a bottom plane 1106a for that server device 1102d. Similarly, FIG. 11B illustrates how the server device 1102e may include a top surface 1108 that corresponds a top plane 1108a for that server device 1102e, and a bottom surface 1110 that corresponds to a bottom plane 1110a for that server device 1102e. Similarly as well, FIG. 11B illustrates how the server device 1102f may include a top surface 1112 that corresponds a top plane 1112a for that server device 1102f, and a bottom surface 1114 that corresponds to a bottom plane 1114a for that server device 1102f.

As such, in some embodiments, the ports 310a-310n on the switch system 300 being located adjacent a respective server device 1102a-1102n in the rack 1100 may include each of those ports being located between the top and bottom planes for that respective server device. For example, FIG. 11B illustrates the port 310d on the switch system 300 located between the top plane 1104a and the bottom plane 1006a for the server device 1102d, the port 310e on the switch system 300 located between the top plane 1108a and the bottom plane 1010a for the server device 1102e, and the port 310f on the switch system 300 located between the top plane 1112a and the bottom plane 1014a for the server device 1102f, and one of skill in the art in possession of the present disclosure will appreciate that the remaining ports on the switch system 300 may be located adjacent their respective server devices in the rack 1100 in a similar manner as well. However, while the adjacency of the ports and their respective computing devices is described herein based on top and bottom planes associated with those computing devices, one of skill in the art in possession of the present disclosure will appreciate that port/computing device adjacency that provides the benefits of the present disclosure may be defined in a variety of other manners that will fall within the scope of the present disclosure as well.

Figure 12A:
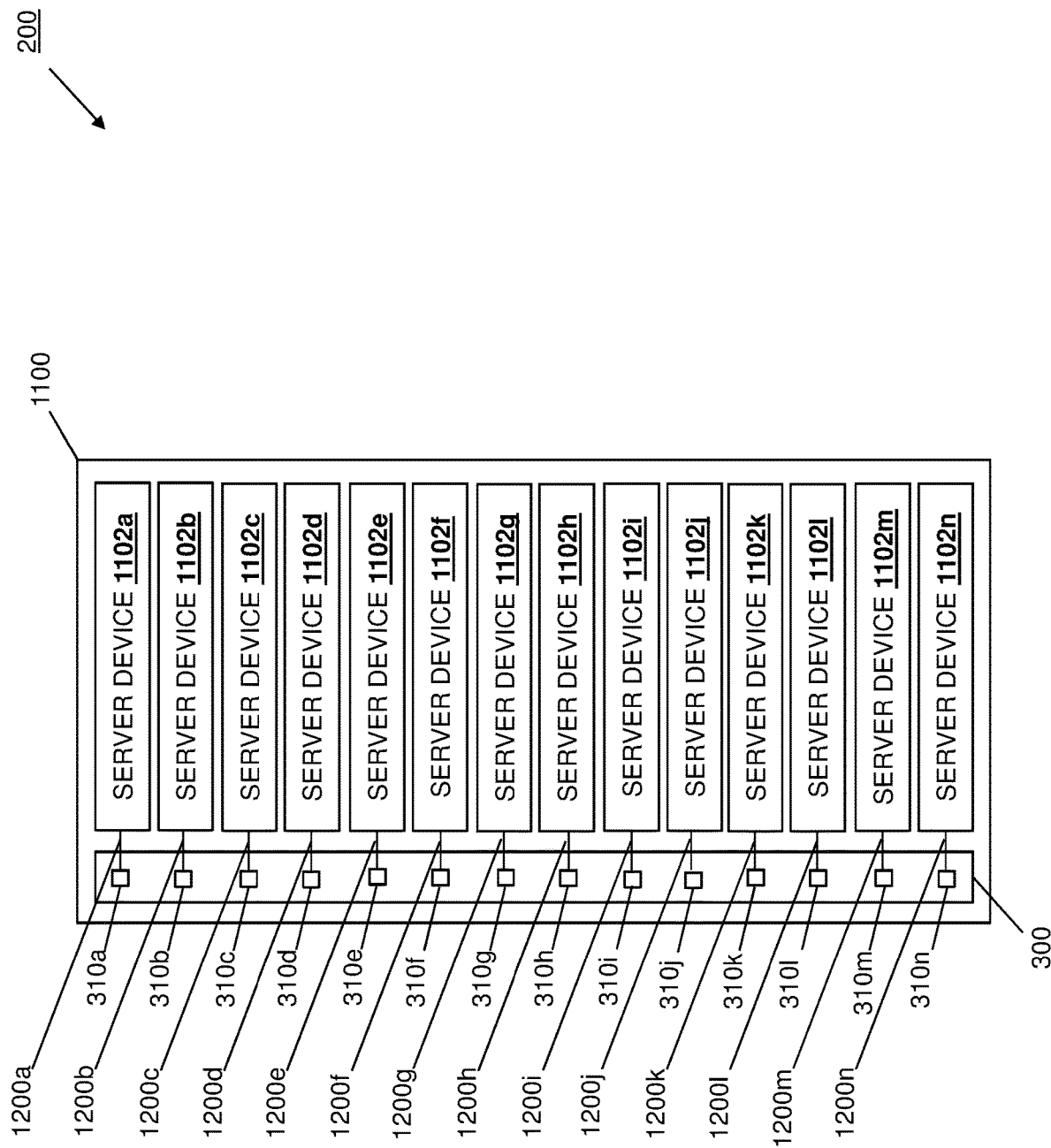
FIG. 12A is a schematic view illustrating an embodiment of the switch system of FIGS. 3A and 3B coupled to server devices in a rack during the method of FIG. 10 to provide the rack switch coupling system of the present disclosure.
Figure 12B:
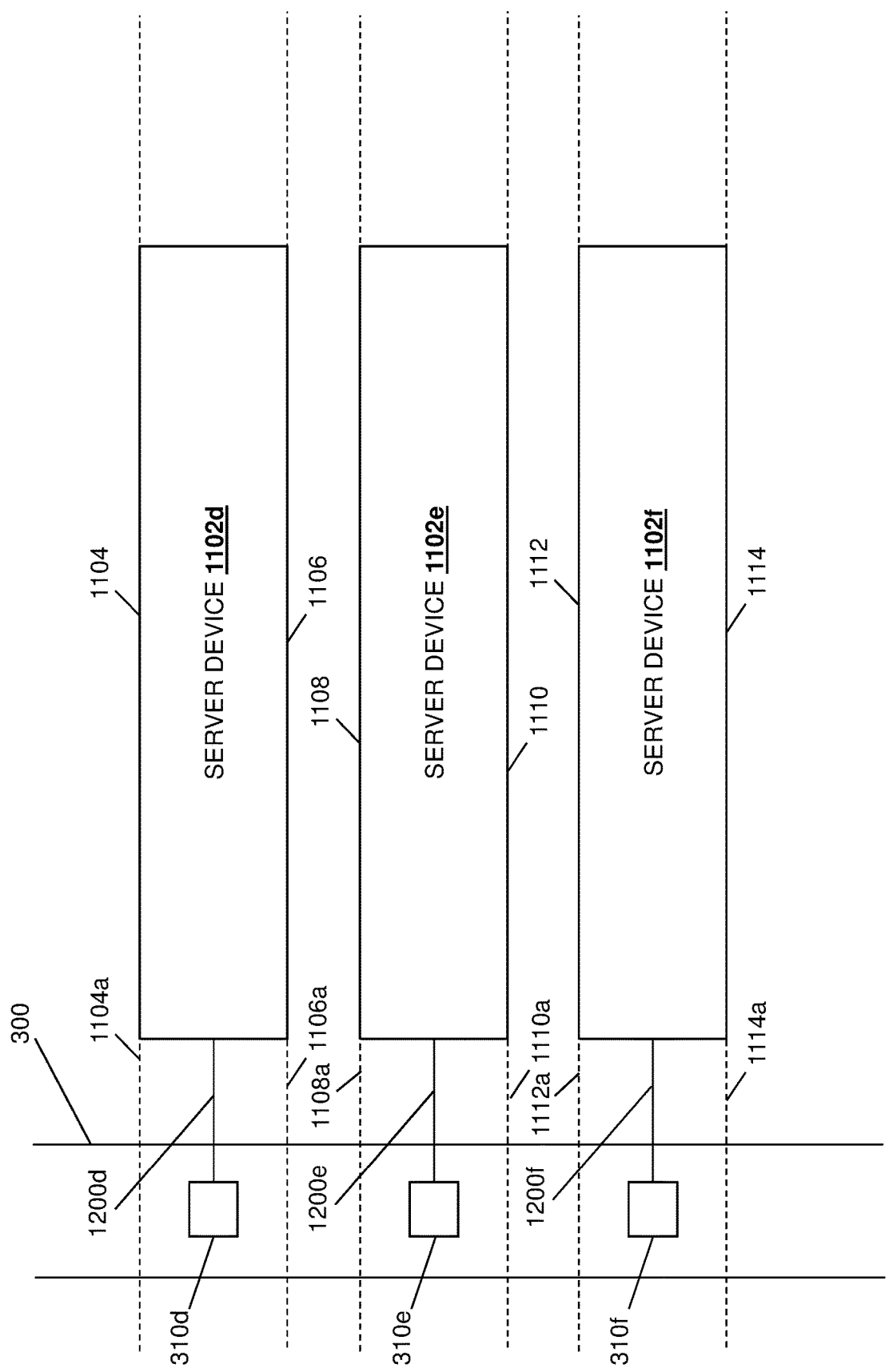
FIG. 12B is a schematic view illustrating an embodiment of some of the ports on the switch system of FIG. 11A coupled to respective server devices provided in the rack of FIG. 12A.

The method 1000 then proceeds to block 1004 where respective cables are connected to each port on the switch system and the respective computing device located adjacent that port. In an embodiment, at block 1004, a cable may be connected to each port on the switch system 300 and the respective server device located adjacent that port. For example, with reference to FIGS. 12A and 12B, a cable 1200a is illustrated as connected to the port 310a on the switch system 300 and the server device 1102a located adjacent the port 310a, a cable 1200b is illustrated as connected to the port 310b on the switch system 300 and the server device 1102b located adjacent the port 310b, a cable 1200c is illustrated as connected to the port 310c on the switch system 300 and the server device 1102c located adjacent the port 310c, a cable 1200d is illustrated as connected to the port 310d on the switch system 300 and the server device 1102d located adjacent the port 310d, a cable 1200e is illustrated as connected to the port 310e on the switch system 300 and the server device 1102e located adjacent the port 310e, a cable 1200f is illustrated as connected to the port 310f on the switch system 300 and the server device 1102f located adjacent the port 310f, a cable 1200g is illustrated as connected to the port 310g on the switch system 300 and the server device 1102g located adjacent the port 310g, a cable 1200h is illustrated as connected to the port 310h on the switch system 300 and the server device 1102h located adjacent the port 310h, a cable 1200i is illustrated as connected to the port 310i on the switch system 300 and the server device 1102i located adjacent the port 310i, a cable 1200j is illustrated as connected to the port 310j on the switch system 300 and the server device 1102j located adjacent the port 310j, a cable 1200k is illustrated as connected to the port 310k on the switch system 300 and the server device 1102k located adjacent the port 310k, a cable 1200l is illustrated as connected to the port 310l on the switch system 300 and the server device 1102l located adjacent the port 310l, a cable 1200m is illustrated as connected to the port 310m on the switch system 300 and the server device 1102m located adjacent the port 310m, and a cable 1200n is illustrated as connected to the port 310n on the switch system 300 and the server device 1102n located adjacent the port 310n As will be appreciated by one of skill in the art in possession of the present disclosure, embodiments of the rack switch coupling system of the present disclosure illustrated in FIGS. 11A, 11B, 12A, and 12B allows for the coupling of the server devices 1102a-1102n to the switch system 300 via a plurality of relatively short, equal length cables 1200a-1200n that do not need to be routed along the height of the rack 1100 to the switch system 300, or bundled together as part of their routing to the switch system 300. As such, one of skill in the art in possession of the present disclosure will appreciate that the airflow issues, server device addition/removal issues from the rack, server device/switch system connection tracing issues, and/or other issues associated with conventional rack switch coupling systems are reduced and/or substantially eliminated.

The method 1000 then proceeds to block 1006 where data is transmitted via each respective cable. In an embodiment, at block 1006, the processing system 304 in the switch system 300 may operate to transmit data via the cables 1200a-1200n with the respective server devices 1102a-1102n while performing any of a variety of conventional switching operations that would be apparent to one of skill in the art in possession of the present disclosure. As such, the switch system 300 may utilize the components of the switch system 700 discussed above to receive optical signals from a server device, transmit those optical signals via an optical waveguide, convert the optical signals to electrical signals, and process those electrical signals as part of the data transmission operations at block 1006. Similarly, the switch system 300 may utilize the components of the switch system 800 discussed above to receive electrical signals from a server device, convert those electrical signals to optical signals, transmit those optical signals via an optical waveguide, convert the optical signals to electrical signals, and process those electrical signals as part of the data transmission operations at block 1006. Similarly as well, the switch system 300 may utilize the components of the switch system 900 discussed above to receive electrical signals from a transceiver that converted optical signals from a server device to produce those electrical signals, convert those electrical signals back to optical signals, transmit those optical signals via an optical waveguide, convert the optical signals to electrical signals, and process those electrical signals as part of the data transmission operations at block 1006. However, while a few specific examples have been provided, one of skill in the art in possession of the present disclosure will appreciate that the data transmission performed at block 1006 may include a variety of other operations that will fall within the scope of the present disclosure as well.

Thus, systems and methods have been described that provide a switch system that extends at least partially along the height of a rack, with ports on that switch system located adjacent each computing device in that rack, allowing for cabling that eliminates the need for any substantial cable routing of the cables between those computing devices and ports and the issues associated with such cable routing. For example, a switch system positioned in a rack may include respective ports cabled to each of a plurality of computing devices in the rack, with each of the respective ports located adjacent the computing device to which it is cabled and between first and second planes corresponding to top and bottom surfaces of that computing device. As will be appreciated by one of skill in the art in possession of the present disclosure, the switch system of the present disclosure frees up space in racks for housing computing devices that has traditionally be utilized for housing switch devices, allows for more cost efficient and easier to install cabling, reduces the amount of time need to add/remove cabling, provides for easier tracing and troubleshooting of cabled ports, reduces the blockage of airflow in the rack introduced by conventional cable routing techniques, reduces the blocking of device status indicators/LEDs introduced by conventional cable routing techniques, reduces the blocking of text on devices that is introduced by conventional cable routing techniques, minimizes cabling mistakes (e.g., the connection of a cable to or removal of a cable from the wrong port), reduces or eliminates the need for cable management systems/hardware, provides for a neater/more organized rack appearance, may be optimized for storing the cables utilized in the rack, narrows the variation in cable lengths utilized with the rack to reduce complexity in cable ordering, and/or provides a variety of other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A rack switch coupling system, comprising:
a rack;
a plurality of computing devices that are positioned in the rack in a stacked orientation, wherein each of the plurality of computing devices includes:
a top surface that corresponds with a first plane associated with that computing device; and
a bottom surface that is located opposite the top surface and that corresponds with a second plane associated with that computing device; and
a switch system that is positioned in the rack and that includes:
a single chassis that extends along a height of the rack; and
respective ports that are included on a wall of the single chassis that extends along the height of the rack, wherein each respective port is respectively cabled to a respective computing device included in the plurality of computing devices via a respective cable that is configured to be connected or disconnected from that respective computing device and that respective port on the wall of the single chassis without repositioning that respective computing device or the switch system, and wherein each of the respective ports is located adjacent the computing device to which it is cabled and between the first plane and the second plane associated with that respective computing device.

2. The system of claim 1, wherein the switch system includes:
an optical signal transmission coupling that extends between a first port on the switch system that is coupled to a first computing device and a processing system included in the switch system, and that is configured to transmit signals between the first computing device coupled to the first port and the processing system.

3. The system of claim 2, wherein the processing system is configured to receive an optical signal transmitted via the optical signal transmission coupling and process the optical signal.

4. The system of claim 2, wherein the switch system includes:
an optical-to-electrical converter that is provided between the optical signal transmission coupling and the processing system and that is configured to convert an optical signal transmitted via the optical transmission coupling to an electrical signal and provide the electrical signal to the processing system, and wherein the processing system is configured to process the electrical signal.

5. The system of claim 2, wherein the switch system includes:
an electrical-to-optical converter that is provided between the first computing device and the optical signal transmission coupling and that is configured to convert an electrical signal transmitted by the first computing device to an optical signal and provide the optical signal to the optical signal transmission coupling.

6. An Information Handling System (IHS), comprising:
a single chassis that is configured to extend along a height of a rack when the single chassis is positioned in the rack;
a processing system that is located in the single chassis;
a memory system that is located in the single chassis, coupled to the processing system, and that includes instructions that, when executed by the processing system, cause the processing system to perform switching operations; and
a communication system that is located in the single chassis, coupled to the processing system, and that includes a plurality of ports, wherein the single chassis is configured to be positioned in the rack including a plurality of computing devices in a stacked orientation such that each of the plurality of ports is:
located on a wall of the single chassis that extends along the height of the rack,
positioned adjacent a respective computing device included the plurality of computing devices and between a first plane corresponding to a top surface of that respective computing device and a second plane corresponding to a bottom surface of that respective computing device that is opposite the top surface, and
provided spaced apart from that respective computing device to allow a respective cable to be connected to or disconnected from that port without repositioning that respective computing device or the single chassis.

7. The IHS of claim 6, further comprising:
an optical signal transmission coupling that is located in the single chassis and extends between a first port included in the plurality of ports that is coupled to a first computing device and the processing system, and that is configured to transmit signals between the first computing device coupled to the first port and the processing system.

8. The IHS of claim 7, wherein the processing system is configured to receive an optical signal transmitted via the optical signal transmission coupling and process the optical signal.

9. The IHS of claim 7, further comprising:
an optical-to-electrical converter that is included in the single chassis, provided between the optical signal transmission coupling and the processing system, and configured to convert an optical signal transmitted via the optical transmission coupling to an electrical signal and provide the electrical signal to the processing system, and wherein the processing system is configured to process the electrical signal.

10. The IHS of claim 7, further comprising:
an electrical-to-optical converter that is coupled to the first port and that is configured to convert an electrical signal transmitted by the first computing device to an optical signal and provide the optical signal to the optical signal transmission coupling.

11. The IHS of claim 6, wherein the processing system includes at least two Application Specific Integrated Circuits (ASICs) that are provided in the single chassis and spaced apart from each other by a distance equal to at least one-third a height of the chassis.

12. A method for coupling a switch device in a rack, comprising:
providing a switch system in a rack including a plurality of computing devices in a computing device stacked orientation, wherein the switch system includes a single chassis having a plurality of ports in a port stacked orientation such that, with the switch system provided in the rack, each port is located on a wall of the single chassis that extends along the height of the rack, adjacent a respective computing device, between a first plane corresponding to a top surface of that respective computing device and a second plane corresponding to a bottom surface of that respective computing device that is opposite the top surface, and spaced apart from that respective computing device, and wherein the single chassis extends along a height of the rack when the switch system is provided in the rack;

connecting a respective cable to each port and the respective computing device located adjacent that port without repositioning the switch system or that respective computing device;

transmitting data via each of the respective cables; and disconnecting one of the respective cables from a port that is included in the plurality port and its respective computing device while the other respective cables remain connected to other ports that are included in the plurality of ports and their respective computing device and without positioning the switch system or the respective computing devices.

13. The method of claim 12, further comprising:

transmitting, by an optical signal transmission coupling that is located in the switch system and that extends between a first port included in the plurality of ports that is coupled to a first computing device and a processing system included in the switch system, signals between the first computing device coupled to the first port and the processing system.

14. The method of claim 13, further comprising:

receiving, by the processing system, an optical signal transmitted via the optical signal transmission coupling; and processing, by the processing system, the optical signal.

15. The method of claim 13, further comprising:

converting, by at least one optical-to-electrical converter that is included in the switch system and provided between the optical signal transmission coupling and the processing system, an optical signal transmitted via the optical transmission coupling to an electrical signal;

providing, by the optical-to-electrical converter, the electrical signal to the processing system, and processing, by the processing system, the electrical signal.

16. The method of claim 13, further comprising:

converting, by an electrical-to-optical converter that is coupled to the first port, an electrical signal transmitted by the first computing device to an optical signal; and providing, by the electrical-to-optical converter, the optical signal to the optical signal transmission coupling.

17. The method of claim 13, wherein the processing system includes at least two Application Specific Integrated Circuits (ASICs) that are provided in the switch device and spaced apart from each other by a distance equal to at least one-third a height of the switch system.

* * * * *